(12) United States Patent
Saikawa et al.

(10) Patent No.: US 9,746,615 B2
(45) Date of Patent: Aug. 29, 2017

(54) LIGHT-SYNTHESIZING LASER DEVICE

(71) Applicant: SHIMADZU CORPORATION, Kyoto-shi (JP)

(72) Inventors: Jiro Saikawa, Kyoto (JP); Naoya Ishigaki, Kyoto (JP); Shingo Uno, Kyoto (JP); Tomoyuki Hiroki, Kyoto (JP); Ichiro Fukushi, Kyoto (JP); Akiyuki Kadoya, Kyoto (JP); Junki Sakamoto, Kyoto (JP); Koji Tojo, Kyoto (JP); Kazuma Watanabe, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 15/310,655

(22) PCT Filed: Jun. 17, 2014

(86) PCT No.: PCT/JP2014/066022
§ 371 (c)(1),
(2) Date: Nov. 11, 2016

(87) PCT Pub. No.: WO2015/193966
PCT Pub. Date: Dec. 23, 2015

(65) Prior Publication Data
US 2017/0082805 A1    Mar. 23, 2017

(51) Int. Cl.
*G02B 6/32* (2006.01)
*G02B 6/02* (2006.01)
(Continued)

(52) U.S. Cl.
CPC ............ *G02B 6/32* (2013.01); *G02B 6/02338* (2013.01); *G02B 6/42* (2013.01); *G02B 6/43* (2013.01); *G02B 27/123* (2013.01)

(58) Field of Classification Search
CPC ..... G02B 6/32; G02B 6/02338; G02B 27/123; G02B 6/43; G02B 6/42
See application file for complete search history.

(56) References Cited

U.S. PATENT DOCUMENTS 5,577,140 A * 11/1996 Endo .................... G02B 6/4209
                                                                       359/332
7,050,238 B2    5/2006 Takahashi et al.
(Continued)

FOREIGN PATENT DOCUMENTS

JP         7-234333        9/1995
JP         2003-347647    12/2003
(Continued)

OTHER PUBLICATIONS

PCT/JP2014/066022, International Search Report dated Sep. 9, 2014, 1 page—English, 3 pages—Japanese.
(Continued)

*Primary Examiner* — Ryan Lepisto
(74) *Attorney, Agent, or Firm* — Andrew F. Young, Esq.; Lackenbach Siegel, LLP

(57) ABSTRACT

The light-synthesizing laser device includes a plurality of collimating lenses that are arranged in a one-to-one relationship with a plurality of laser light sources which exhibit anisotropy in a laser light emission angle, and that convert laser light beams emitted from the laser light sources into parallel light; a condensing lens that condenses the laser light that has been converted into parallel light by the plurality of collimating lenses; and an optical fiber (5) having a square waveguide core (SC) which has a square shape, the fiber receiving and synthesizing the laser light condensed by the condensing lens. A longitudinal axis of a condensed beam condensed by the condensing lens is aligned with a diagonal axis of the square waveguide core.

1 Claim, 8 Drawing Sheets

(51) Int. Cl.
G02B 27/12 (2006.01)
G02B 6/43 (2006.01)
G02B 6/42 (2006.01)

(56) References Cited

U.S. PATENT DOCUMENTS 7,830,609 B2 11/2010 Inoue et al.
2004/0027631 A1* 2/2004 Nagano ................ G02B 6/4206
372/36

FOREIGN PATENT DOCUMENTS

| | | |
|---|---|---|
| JP | 2003347647 | 12/2003 |
| JP | 2005114977 | 4/2005 |
| JP | 2009080468 | 4/2009 |
| JP | 2009-168914 | 7/2009 |

OTHER PUBLICATIONS

PCT/JP2014/066022, International Search Report and Written Opinion, dated Dec. 20, 2016 10 pages—English.

* cited by examiner

LIGHT-SYNTHESIZING LASER DEVICE

CROSS REFERENCE TO RELATED INVENTIONS

This application relates to and claims §371 national phase priority from PCT/JP2014/066022 filed Jun. 17, 2014, the entire contents of which are incorporated herein by reference.

FIGURE SELECTED FOR PUBLICATION

FIG. 1

BACKGROUND OF THE INVENTION

Field of the Invention

The present invention relates to a light synthesis laser apparatus that synthesize the laser light emitted from a plurality of laser light sources by converging lights.

Description of the Related Art

It is known that a light synthesis laser apparatus synthesizes the laser light emitted from a plurality of laser light sources by converging in order to provide a high-power output laser light. Such laser apparatus is disclosed in e.g., Patent Document 1 and Patent Document 2.

According to Patent Document 1, such apparatus comprises a plurality of laser light sources having anisotropy relative to the laser radiation angle, a plurality of collimating lenses, that are installed in one to one relative to the laser light source converts each laser light irradiated from the laser light sources to parallel light, a converging lens that converges the laser light converted to parallel light by each collimating lens, and a synthetic optical element that synthesizes the synthesized laser light with the incident laser light converged by the converging lens. The laser light sources are in-place as the length direction of the emitting region of the laser light coincides with the diameter direction of the converging lens. Accordingly, the low cost laser light with a simple structure may be synthesized efficiently.

According to Patent Document 2, a connection means comprises a collimating optical element, an anamorphic optical element, and an optical element for light convergence in an optical system of light power synthesis that connects laser lights from a plurality of laser light sources in-place in M×M (M>N) to the optical receptor using the connection means, wherein the anamorphic elements are in-place as a magnifying power of the array direction of the number M is larger than the magnifying power of the array direction of the number N. Accordingly, lights from the plurality of the laser light sources are efficiently connected so that high power output can be obtained.

PRIOR ART RELATED ART DOCUMENTS

Patent Document

Patent Document 1: JP 2009-80468 A
Patent Document 2: JP 2005-114977 A

ASPECTS AND SUMMARY OF THE INVENTION

Problems to be Solved by the Invention

However, according to Patent Document 1 and Patent Document 2, in the case of that the laser lights of a plurality of laser sources having anisotropy relative to the laser radiation angle are connected to an ordinal circular core optical fiber by crafting an arrangement of each laser light and an optical element, the number of optical elements for forming beam increases, so that the cost will up due to increases in complexity of such apparatus. In addition, the diameter of the circular core should be matched to the long axis beam diameter, so that the core size of the optical fiber becomes larger and the cross section area of the circular core also becomes larger and as results, the brightness thereof decreases.

The purpose of the present invention is to provide a light synthesis laser apparatus that can make a smaller output light emitting area than a circular light waveguide so that the brightness thereof can be improved.

Means for Solving the Problem

According to claim 1 of the present invention to solve the above objects, an apparatus comprises a plurality of laser light sources having anisotropy relative to the laser radiation angle; a plurality of collimating lenses that are installed in one to one relative to the plurality of laser light sources converts each laser light irradiated from the laser light sources to parallel light; a converging lens that converges the laser light converted to parallel light by each collimating lens; an optical fiber that receives the incident laser light converged by the converging lens and synthesizes the laser light includes a square waveguide core having an square shape; wherein the long axis of the convergent beam converged by the converging lens coincides with the diagonal axis of the square waveguide core of the optical fiber.

Effect of the Invention

According to the aspect of the present invention, a light synthesis laser apparatus that can make a smaller output light emitting area than a circular light waveguide and can increase the brightness and light density thereof can be provided.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
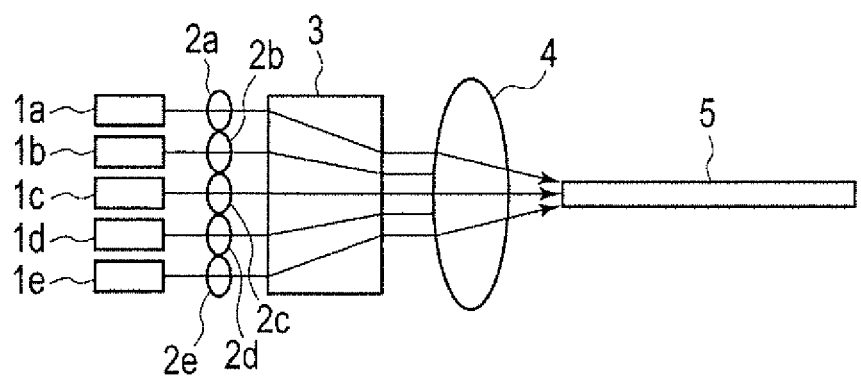
FIG. 1 is a schematic diagram illustrating the structure of a light synthesis laser apparatus according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereinafter, referring to FIGs., the inventor sets forth further detail of a light synthesis laser apparatus according to the aspect of the Embodiment of the present invention.

Embodiment 1

FIG. 1 is a schematic diagram illustrating the structure of a light synthesis laser apparatus according to the aspect of the Embodiment 1 of the present invention. Referring to FIG. 1, a light synthesis laser apparatus comprises a plurality of laser sources 1a-1e, a plurality of collimating lenses 1a-2e, a steering optical element 3, a light converging lens 4 and an optical fiber 5.

Each of plurality of laser sources 1a-1e structured with a semiconductor diode laser has anisotropy relative to the laser light radiation angle and outputs an ellipsoidal laser light. The plurality of collimating lenses 2a-2e that are installed in one to one relative to the plurality of laser light sources 1a-1e convert each laser light irradiated from the plurality of laser light sources 1a-1e to parallel light.

The steering optical element 3 changes the travel direction of the parallel light converted by the plurality of collimating lenses 2a-2e to guide to a converging lens 4. The converging lens 4 converges each laser light from the steering optical element 3. The optical fiber 5 has a circular structure and comprises the square waveguide core SC that receives the incident laser light converged by the converging lens 4 and synthesizes the synthetic laser light.

Figure 2:
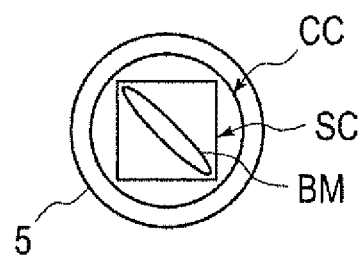
FIG. 2 is a cross section view of an optical fiber when the square waveguide core in the light synthesis laser apparatus according to the aspect of the Embodiment 1 and illustrating the convergent beam.

FIG. 2 is a cross section view of the optical fiber when the square waveguide core SC in the light synthesis laser apparatus according to the aspect of the Embodiment 1 and illustrating the convergent beam BM. Referring to FIG. 2, the convergent beam BM converged by the converging lens 4 has the ellipsoidal shape. The long axis of the convergent beam BM and the diagonal axis of the square waveguide core SC of the optical fiber 5 coincide and the diagonal length of the square waveguide core SC is longer than the size (length) of the long axis direction beam of the convergent beam BM.

Further, the square waveguide core SC having four corners of square waveguide core SC as if approximately contacting the circumference of the conventional circular waveguide core CC is being applied. Therefore, the area of the square waveguide core SC is smaller than the area of the circular waveguide core CC.

In such way, according to the light synthesis laser apparatus associated with the aspect of the Embodiment 1, the square waveguide core SC of the optical fiber 5 is applied, the long axis of the convergent beam BM and the diagonal axis of the square waveguide core SC coincide, the diagonal length of the square waveguide core SC is longer than the size of the long axis direction beam of the convergent beam BM, so that, referring to FIG. 2, the size of the light waveguide can be smaller than the circular waveguide core CC and the output light emitting area can be smaller than the circular waveguide core CC so that the brightness thereof can be improved.

Embodiment 2

Figure 3:
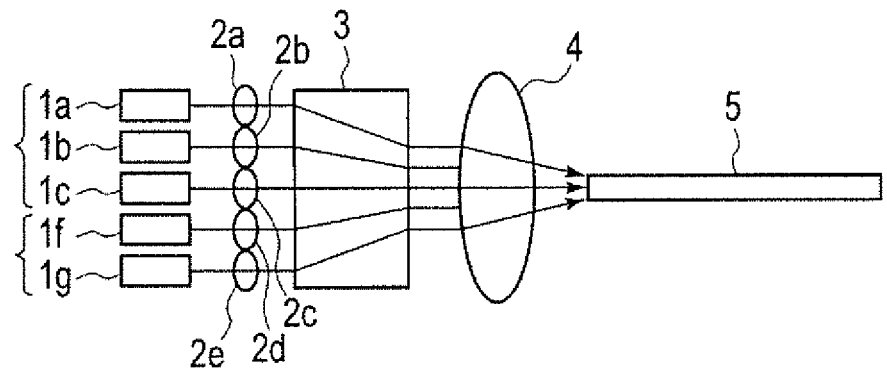
FIG. 3 is a schematic diagram illustrating the structure of a light synthesis laser apparatus according to the aspect of the Embodiment 2 of the present invention.

FIG. 3 is a schematic diagram illustrating the structure of a light synthesis laser apparatus according to the aspect of the Embodiment 2 of the present invention. Referring to FIG. 3, a light synthesis laser apparatus comprises a plurality of laser light sources 1a-1c, a plurality of laser light sources 1f-1g, a plurality of collimating lenses 2a-2e, a steering optical element 3, a converging lens 4 and an optical fiber 5.

The plurality of laser light sources 1a-1c correspond to a plurality of the first laser light sources of the present invention and have anisotropy relative to the radiation angle of the laser light and an ellipsoidal shape. The plurality of laser light sources 1f-1g correspond to a plurality of the second laser light sources of the present invention and have anisotropy relative to the radiation angle of the laser light and an ellipsoidal shape, and further have a light emitting region and the width direction thereof is orthogonal to the width direction of the light emitting region of the plurality of the laser light sources 1a-1c.

The plurality of collimating lenses 2a-2e that are installed in one to one relative to the plurality of laser light sources 1a-1e and the plurality of laser light sources 1a-1e and convert each laser light irradiated from the laser light sources to parallel light.

The converging lens 4 provides a first convergent beam by converging the converted laser lights to parallel light by the collimating lenses 2a-2c and provides a second convergent beam by converging the converted laser light to parallel light by the collimating lenses 2d-2e. The inventor omits the explanation as to the function of the steering optical element 3 because of the same aspect as referring to FIG. 1

The optical fiber 5 comprises the square waveguide core SC that receives the incident first convergent beam and second convergent beam converged by the converging lens 4 and synthesize the synthetic laser light.

Figure 4:
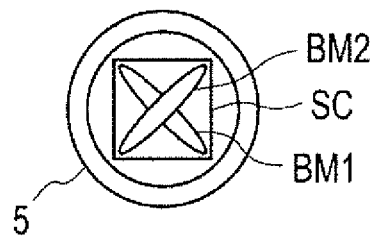
FIG. 4 is a cross section view of an optical fiber when the square waveguide core in the light synthesis laser apparatus according to the aspect of the Embodiment 2 and illustrating the convergent beam at each diagonal axis of the square waveguide core.

Referring to FIG. 4, the first convergent beam BM 1 and the second convergent beam BM 2 have an ellipsoidal shape. The long axis of the first convergent beam BM1 and one of diagonal axes of the square waveguide core SC of the optical fiber should coincide and the long axis of the second convergent light beam BM1 and another one of diagonal axes of the square waveguide core SC of the optical fiber should coincide.

The first convergent beam BM 1 and the second convergent beam BM 2 are orthogonal. Further, the length of one of the diagonal axes of the square waveguide core SC is longer than the size of the long axis direction beam BM 1. Another diagonal length of the square waveguide core SC is longer than the size of the long axis direction beam of the convergent beam BM2.

According to the light synthesis lase apparatus associated with the aspect of the Embodiment, the long axis of the first convergent light beam BM1 and one of diagonal axes of the square waveguide core SC of the optical fiber coincide and the long axis of the second convergent beam BM1 and another one of diagonal axes of the square waveguide core SC of the optical fiber coincide so that the output polarized light can be averaged.

Embodiment 3

Figure 5:
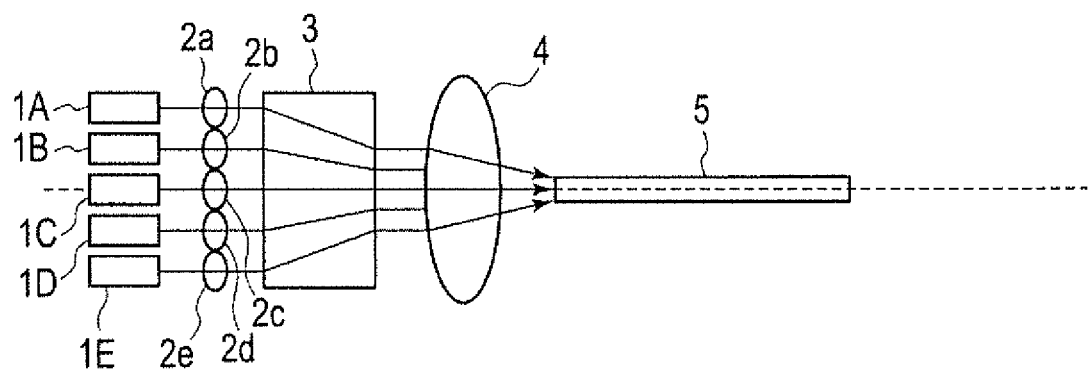
FIG. 5 is a schematic diagram illustrating the structure of a light synthesis laser apparatus according to the aspect of the Embodiment 3 of the present invention.

FIG. 5 is a schematic diagram illustrating the structure of a light synthesis laser apparatus according to the aspect of the Embodiment 3 of the present invention. Referring to FIG. 5, a light synthesis laser apparatus according the aspect of the Embodiment 3 comprises a plurality of laser sources 1A-1E, a plurality of collimating lenses 1a-2e, a steering optical element 3, a light converging lens 4 and an optical fiber 5.

The plurality of laser light sources 1A-1E have anisotropy relative to the radiation angle of the laser light, and the light axis of the laser light source 1C, the center of the lens 2c and the light axis of the optical fiber 5 coincide. In addition, the plurality of the laser light sources 1A-1B and the plurality of the laser light sources 1D-1E are in-place symmetrically sandwiching the laser light source 1C. Accordingly, the convergent beam BM3 having the horizontally long ellipsoidal shape is incident in the approximately central part of the circular optical fiber 5.

Figure 7:
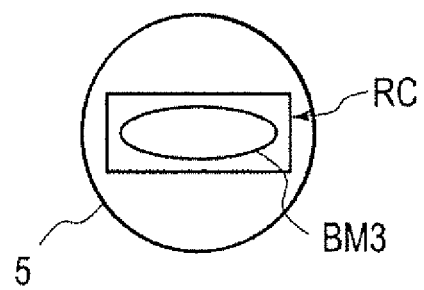
FIG. 7 is a cross section view of an optical fiber when the rectangular waveguide core in the light synthesis laser apparatus according to the aspect of the Embodiment 3 of the present invention and illustrating the convergent light beam.

Referring to FIG. 7, the optical fiber 5 has the rectangular waveguide core RC receiving the incident convergent beam BM3 having a horizontally long ellipsoidal shape, the long axis of the convergent beam BM3 is in-place in the horizontal direction of the rectangular waveguide core RC and the short axis of the convergent beam BM3 is in-place in the longitudinal direction of the rectangular waveguide core RC.

Figure 6:
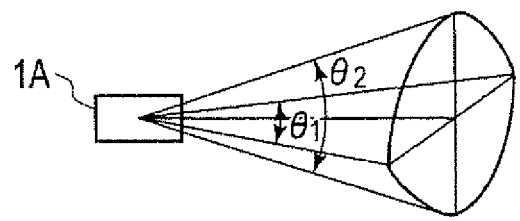
FIG. 6 is a schematic diagram illustrating the radiation angle ratio between the radiation angle in the width direction light emitting region and the radiation angle in the thickness direction of the laser light source of a light synthesis laser apparatus according to the aspect of the Embodiment 3 of the present invention.

Further, referring to FIG. 6, the aspect ratio of the waveguide core RC is set as more than the ratio between the radiation angle θ 1 of the width direction of the light emitting area of the laser light source 1A and the radiation angle θ 2 of the thickness direction thereof.

In such way, referring to FIG. 6, according to the light synthesis laser apparatus associated with the Embodiment 3, the aspect ratio of the waveguide core RC is set as more than the ratio between the radiation angle $\theta_1$ of the width direction of the light emitting area of the laser light source 1A and the radiation angle $\theta_2$ of the thickness direction thereof so that the convergent beam BM3 can be assuredly set in the waveguide core RC.

Figure 8:
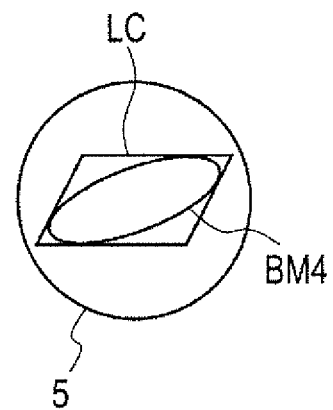
FIG. 8 is a schematic diagram illustrating the structure of a light synthesis laser apparatus according to the aspect of the alternative Example of the Embodiment 3 of the present invention.

FIG. 8 is a schematic diagram illustrating the structure of a light synthesis laser apparatus according to the aspect of the alternative Example of the Embodiment 3 of the present invention. Referring to FIG. 8, in such Embodiment, a rhombic waveguide core LC is applied to the optical fiber 5. The long axis of the convergent beam BM4 and the longer diagonal axis of the waveguide core LC coincide and the shorter axis of the convergent beam BM4 and the short diagonal axis of the waveguide core LC coincide. Even if in such structure, the same effect as according to the aspect of the Embodiment 3 can be obtained.

INDUSTRIAL APPLICABILITY

The present invention can be applied to a laser machining apparatus, a display device, a measurement devise, a medical device and so forth.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A light synthesis laser apparatus, comprising:
   a first plurality of first laser light sources having anisotropy relative to a first laser radiation angle and having a first light emitting area having a first width direction and each irradiating a first laser light;
   a second plurality of second laser light sources each irradiating a second laser light and each having anisotropy relative to a second radiation angle of said second laser light and a second light emitting area having a second width direction of which the second width direction is orthogonal to the first width direction of the first light emitting area of said plurality of the first laser light sources;
   a plurality of first collimating lenses installed in a one to one alignment relative to said first plurality of the first laser light sources and a plurality of second collimating lenses that are installed in a one to one alignment relative to said second plurality of the second laser light sources, and said pluralities of said first and said second collimating lenses converts each respective laser light irradiated from said first plurality of laser light sources and said second plurality of said laser light sources into parallel light;
   a first converging lens that converges the first laser lights converted to said parallel light by the plurality of first collimating lens corresponding to said plurality of the first laser-light sources among said plurality of the first collimating lenses to provide a first convergent beam and a second converging lens that converges the second laser lights converted to said parallel light by the second collimating lenses corresponding to said plurality of the second laser light sources among said plurality of the second collimating lenses to provide a second convergent beam; and
   an optical fiber including a square waveguide core and having an square shape receives as a first incident laser light and a second incident second laser light each respectively converged by said first and said second converging lenses and synthesizes a synthetic laser light;

wherein a first long axis of said first convergent light beam converged by said first converging lens coincides with a diagonal axis of said square waveguide core of said optical fiber and a second long axis of second convergent light beam converged by said second converging lens coincides with another diagonal axis of said square waveguide core of said optical fiber.

* * * * *